Patented July 17, 1923.

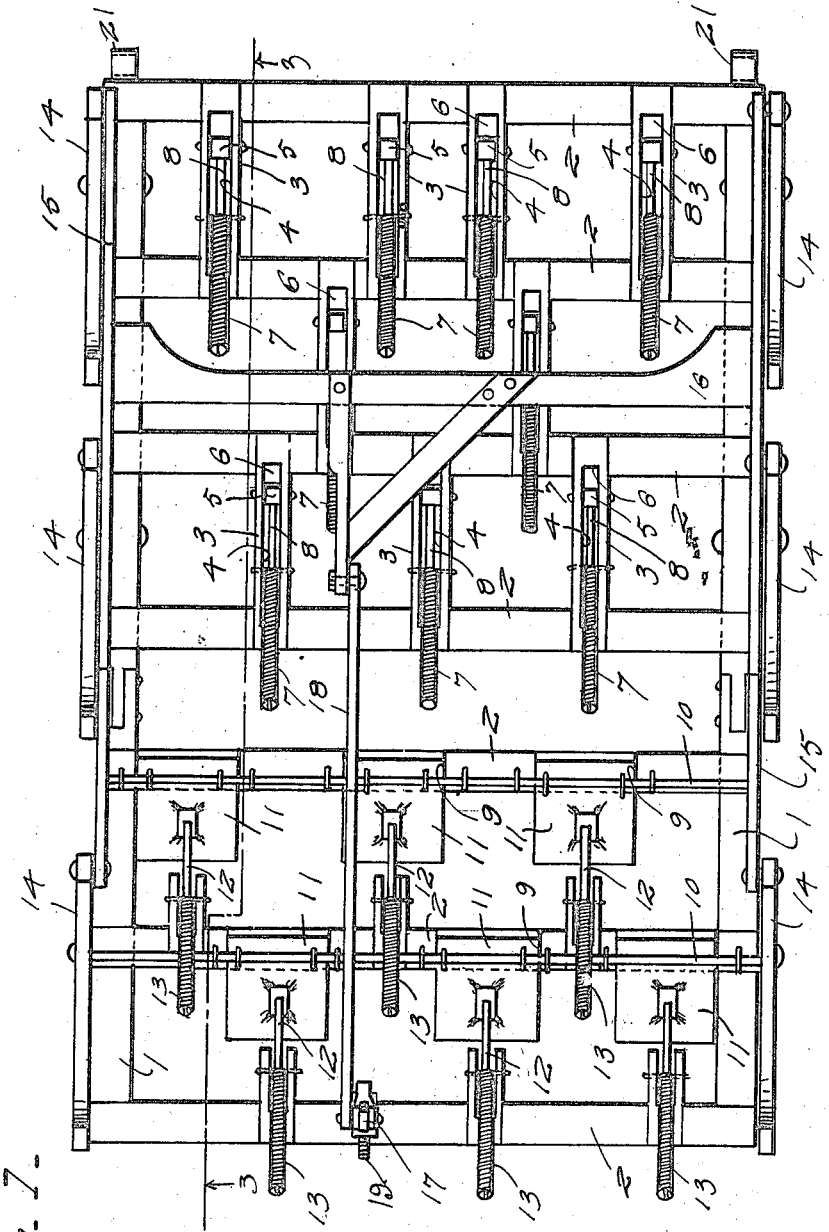

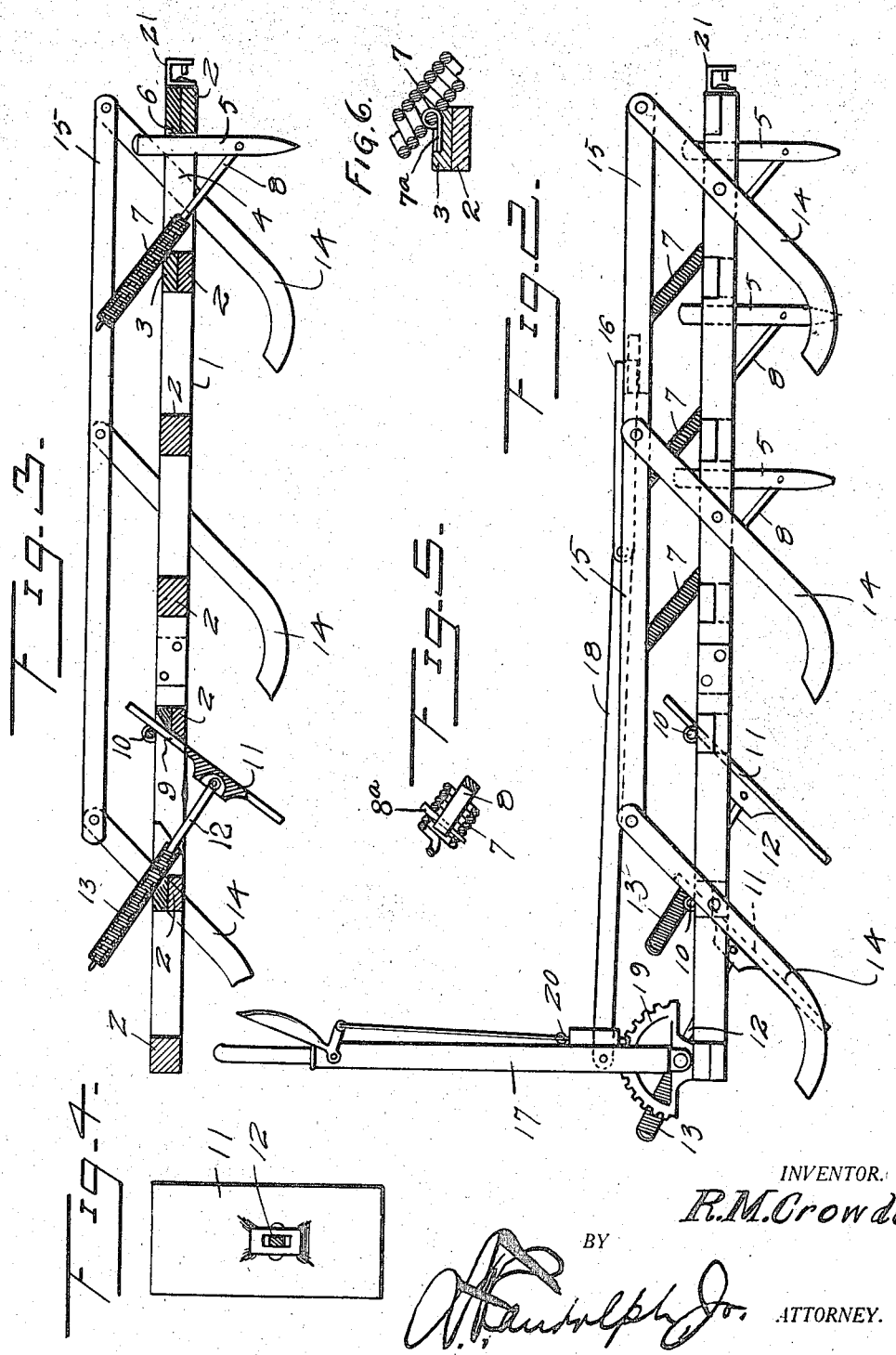

1,462,324

UNITED STATES PATENT OFFICE.

RILEY M. CROWDER, OF HOLLAND, KENTUCKY, ASSIGNOR OF ONE-HALF TO CHARLES L. WOOD, OF HOLLAND, KENTUCKY.

HARROW.

Application filed November 26, 1920. Serial No. 426,499.

*To all whom it may concern:*

Be it known that I, RILEY M. CROWDER, a citizen of the United States, residing at Holland, in the county of Allen and State of Kentucky, have invented certain new and useful Improvements in Harrows; and I do hereby declare the following to be a full, clear, and exact description of the invention, such as will enable others skilled in the art to which it appertains to make and use the same.

This invention relates to harrows and it consists in the novel features hereinafter described and claimed.

An object of the invention is to provide a harrow of simple and durable structure having soil engaging members which are resiliently mounted and adapted to swing rearwardly and upwardly when they come in contact with clods, roots or stones whereby they may pass over the same and reduce the soil and the clods to a fine condition as for instance a dust mulch.

With this object in view the harrow comprises a frame consisting of longitudinally disposed side bars and transversely disposed cross bars, the said bars being fixed with relation to each other. At the forward portion of the frame blocks are supported by the cross bars and harrow teeth are pivotally mounted in openings provided in the said blocks. Means are provided for limiting the swinging movement of the harrow teeth. Rods are pivotally connected with the intermediate portions of the teeth at the rear sides thereof and springs are connected with the blocks and the said rods engage the springs. At the rear portion of the harrow panels are pivotally mounted upon the cross bars and means are provided for limiting the swinging movement of the panels. The panels are normally held disposed rearwardly and downwardly and rods are connected at their forward ends with the intermediate portions of the panels and their rear ends engage springs which are attached to the cross bars. The lower portions of the teeth and the panels are adapted to engage the soil and the teeth serve to break the clods and the panels serve to reduce the broken particles of the clods to fine particles or a dust mulch. Runners are pivotally connected with the side bars of the frame and their lower ends are curved rearwardly. Bars pivotally connect the upper ends of the runners which are located at the same side of the frame together. A lever is fulcrumed at the rear portion of the frame and is operatively connected with the runners and the bars which connect the runners together. By swinging the lever it is apparent that the lower portions of the runners may be swung down with relation to the frame and consequently the frame will be lifted inasmuch as the lower end of the runners will come in contact with the surface of the ground. When the lower ends of the runners are swung upwardly and rearwardly the lower ends of the teeth and the panels come in contact with the soil and operate upon the same as hereinbefore indicated.

In the accompanying drawings:—

Figure 1 is a top plan view of the harrow.
Figure 2 is a side elevation of the same.
Figure 3 is a longitudinal sectional view of the same.

The other figures are detailed views of the features of the invention.

The frame of the harrow consists of longitudinally disposed side bars 1 which are connected together by cross bars 2. The cross bars 2 are spaced from each other and are parallel with relation to each other. The cross bars 2 at the intermediate and forward portion of the frame of the harrow carry blocks 3 which are disposed parallel with the side bars 1 and spaced from each other. The blocks 3 are provided with longitudinally disposed openings 4 in which are pivotally mounted harrow teeth 5. The upper forward corner portions of the blocks at the forward ends of the openings 4 are chamfered or beveled as at 6 and the teeth 5 are pivoted in the blocks so that when the teeth are in vertical position their forward sides are against the forward walls of the openings 4 and when the lower ends of the teeth 5 are swung rearwardly the upper forward portions of the teeth come in contact with the chamfered surfaces 6. Thus means are provided for limiting the swinging movement of the teeth in the blocks. Coil springs 7 are connected in any suitable manner with the rear portions of the blocks 3 as at 7ª and the forward ends of the springs are located in the openings 4. Rods 8 are pivotally connected at their forward ends with the intermediate portions of the teeth 5 and at the rear sides thereof and the upper rear portions of the rods 8 are received in the coils of the springs 7 and are fixed thereto as at

8ª. Hence it will be seen that the springs and rods serve as means for normally holding the teeth 5 in vertical positions and with their forward surfaces in engagement with the forward end walls of the openings 4. When the teeth are swung rearwardly as hereinbefore indicated the rods 8 are moved rearwardly and the springs 7 are stretched. Therefore when the teeth pass over the object or obstruction which causes them to swing rearwardly they are swung forwardly and to normal positions under the influence of the springs and rods.

Appropriate cross bars 2 at the rear portion of the frame are provided at their upper rear edges with recesses 9, the bottom surfaces of which are anti-clinal, that is to say the lower wall of each recess is provided with two surfaces which are pitched at an angle with relation to each other, and the said angle is upwardly disposed. Rods 10 are fixed to the upper rear portions of the rear cross bars 2 and they bridge the recesses 9. Panels 11 are pivotally mounted upon the rods 10 and each recess 9 receives the upper portion of one panel 11. The panels are adapted to be swung upon the rods 10 whereby the forward surfaces of the panels may engage either of the surfaces of the anti-clinal bottom walls of the recesses 9. Hence the lower portions of the panels may swing upwardly and rearwardly but means are provided for limiting the swinging movement of the panels. Rods 12 are pivotally connected at their lower forward ends with the intermediate portions of the panels 11 at the rear sides thereof and springs 13 are mounted upon the rear cross bars 2 and receive the upper ends of the rods 12 which are connected with the panels mounted upon the cross bar immediately in front. Hence it will be seen that means are provided for resiliently holding the lower rear end portions of the panels at their lowermost position. In the event that the panels strike an obstruction they may swing upwardly and rearwardly at their lower portions whereby they may ride over the said obstruction, and reduce the same to a dust mulch, or as in the case of a stone or root may pass over the same without damage.

Runners 14 are pivotally connected at points between their ends to the longitudinally disposed bars 1 and the lower ends of the said runners are curved rearwardly and downwardly. Bars 15 are pivotally connected with the upper ends of the runners 14 which are located at the same side of the frame of the harrow and a cross bar 16 is connected at its ends with the bars 15 which are located at the opposite sides of the frame of the harrow. A lever 17 is fulcrumed at the rear portion of the frame of the harrow and is connected by means of a rod 18 with the intermediate portion of the bar 16. A dentate segment 19 is mounted upon the frame of the harrow adjacent the lever 17 and the lever carries a spring pressed pawl 20 which is adapted to engage in the spaces between the teeth of the dentate segment 19 in a usual manner, whereby the said lever is held at an adjusted position.

It is apparent that when the lever 17 is swung the rod 18 is moved longitudinally whereby the bars 15 and 16 are moved and the runners 14 are swung upon their pivotal connection with the side bars 1 of the frame of the harrow. When the lower ends of the runners are moved in a downward direction they engage the surface of the soil and lift the frame of the harrow whereby the work engaging ends of the soil engaging members are lifted above the surface of the soil. Consequently the harrow may be readily moved from point to point. When the lower ends of the runners are swung upwardly and rearwardly by manipulating the lever as hereinbefore described the work engaging ends of the soil engaging members are lowered in contact with the soil and may operate in the manner as hereinbefore described.

It will be observed that the panels 11 of the several series of panels extend completely across the space between the inner surfaces of the side bars of the frame of the harrow. Thus all portions of the surface of the soil over which the harrow moves are operated upon by the said panels. In lines longitudinally of the frame of the harrow the teeth 5 are set relatively close together so that they will effectually operate in the soil to break the large clods in small lumps preparatory to the pulverizing action exercised upon them by the said panels.

Suitable hooks 21 are located on the forward corners of the frame, as shown in Figures 1, 2 and 4, so that draft mechanism may be connected with the hooks 21 in any suitable and well known manner.

From the foregoing description taken in conjunction with the accompanying drawings it will be seen that a harrow of simple and durable structure is provided and that the same may be used to advantage for quickly and effectually reducing the soil to a fine condition or to the condition of a dust mulch preparatory for seeding and planting in the usual manner.

Having described the invention what is claimed is:

1. A harrow comprising resiliently mounted teeth, a resiliently supported panel to coact therewith, and means for limiting swinging movement of the teeth and panel.

2. In a harrow a frame, blocks supported upon the frame, each block having an opening, soil treating members pivotally mounted in the openings of the blocks, means for limiting the swinging movement of the members, coil springs connected with the blocks, and rods connected with the intermediate portions of the members and entering the coil springs and engaging the same.

3. In a harrow a block having an opening and provided at the forward end of its opening with a chamfered surface, a soil treating member pivoted in the block and extending through the opening and adapted to engage the forward end thereof when in a vertical position and adapted to engage the chamfered surface when inclined with relation to the block, a spring connected with the block, and a rod pivotally connected with the member and entering the spring and engaging the same.

4. In a harrow a bar provided with a recess having an anticlinal bottom wall, a rod mounted upon the bar and bridging said recess, a soil treating member pivotally mounted upon the rod and adapted to engage at its forward surface the surfaces of the anticlinal bottom of the recess when the member assumes different positions, a spring fixed to the member, and a rod pivotally connected with the member at the intermediate portion thereof and entering the spring and engaging the same.

In testimony whereof I affix my signature in presence of two witnesses.

RILEY M. CROWDER.

Witnesses:
CAMMIE S. DOSS,
WILLIE A. DOSS.